United States Patent Office 3,737,469
Patented June 5, 1973

3,737,469
PROCESS FOR THE PRODUCTION OF BROMO-
STYRENE AND ALKYL BROMIDE
Gila Berger, Stephen Daren, Moshe Levy, and David Vofsi, Rehovot, Israel, assignors to Yeda Research and Development Co., Ltd., Rehovot, Israel
No Drawing. Filed Nov. 18, 1971, Ser. No. 200,239
Claims priority, application Israel, Nov. 23, 1970, 35,708
Int. Cl. C07c 25/28
U.S. Cl. 260—650 R     8 Claims

ABSTRACT OF THE DISCLOSURE

The present invention relates to a novel process for the simutlaneous production of bromostyrene and an alkyl bromide, which comprises contacting alpha-bromoethyl bromobenzene or betabromoethyl bromobenzene and an alkanol with a molten alkali metal bromide or with an alkaline earth bromide at a temperature between about 250–500° C. The reactants are advantageously passed through a bed of the molten salt and rapidly quenched after the passage through the reaction zone.

BACKGROUND OF THE INVENTION

Bromostyrene is a well-known monomer, being either a para-, meta-, or ortho-bromo derivative, or a mixture of these derivatives and various methods are known for its preparation. One is the dehydration of the respective bromophenyl methyl carbinol, or the respective $\beta$-bromophenyl ethyl-alcohol. Another is the dehydrobromination of either of the respective $\alpha$-, or $\beta$-haloethyl mono bromobenzene isomers, henceforth to be termed "the substrate."

This latter method is exemplified in British Patent No. 986,634. The dehydrobromination of bromoethyl-halobenzenes is effected by passing a mixture of the above reactant together with an excess of steam over a granular calcium sulfate catalyst. The use of calcium sulfate as catalyst in vapor-phase dehydrohalogenations of substituted halobenzenes is also mentioned in U.S. Patent No. 2,485,524. Other catalysts described in the literature for affecting dehydrohalogenation are calcium chloride, calcium oxide, calcium phosphate and various aluminas.

When applied to bromoethylbromobenzene, all these catalysts exhibit the serious drawback of causing the formation and deposition on the catalyst of tarry substances, most probably a polymer formed from the monomeric bromostyrene that is itself the primary product of the catalytic dehydrohalogenation. The polymer formation cannot be avoided even when a large excess of an inert diluent, such as steam or nitrogen, is fed together with the substrate. The polymer deposition on the catalyst reduces rapidly its activity and frequent catalyst regenerations are required. If the catalyst is rejected after brief runs, recharging with fresh catalyst becomes a costly operation.

To eliminate the deposition of the above mentioned tarry by-products on the fixed bed of the catalyst, a process is described in French Patent 1,576,909, issued to Lummus Company, wherein the active catalyst as well as reaction medium comprises certain molten salt mixtures, and in particular mixtures containing bivalent metal chlorides, such as copper chloride, in combination with other salts which decrease the melting point of the salt mixture.

While, according to this disclosure it is possible to obtain, for example, high yields of vinyl-chloride by elimination of hydrogen chloride from ethylene dichloride, the process produces poor yields of monomers in the case of heavy, relatively non-volatile substrates. In particular, when the substrates according to the present invention are used, the conversion to the respective products is far from complete.

If the contact time of the substrate with the molten salts is extended in order to increase the conversion, a large amount of polymer is obtained as undesired by-product. This polymer accumulates on the molten salt surface and has to be removed periodically from the reactor.

On the other hand, if a diluting inert gas is used, such as nitrogen, the contact time is decreased and large amounts of unconverted substrate appear together with the product. A fractionating distillation in a vacuum is then an unavoidable step, still further increasing losses of the desired product.

SUMMARY OF THE INVENTION

The present invention relates to a novel process for the simultaneous production of bromostyrene and an alkyl bromide, which comprises contacting $\alpha$-bromoethyl bromobenzene or $\beta$-bromoethyl bromobenzene with a molten alkali metal bromide or with an alkaline earth bromide at a temperature in the range of between 250° C. and 500° C.

Bromostyrene is a reactive monomer which can be polymerized to a hard, transparent plastic which has many uses. It can be copolymerized with other monomers to result in copolymers which are fire retardant and self-extinguishing. It is of particular interest as a reactive component in unsaturated polyester compositions, to result in self-extinguishing transparent plastic compositions, that do not become discoloured upon prolonged exposure to weather conditions.

The term "bromostyrene" as used herein means parabromo-, meta-bromo-, or ortho-bromo-styrene or a mixture of any of these. It will henceforth be termed "the product."

When the process of French Patent No. 1,576,909 mentioned above, is applied to heavy, relatively non-volatile substrates, the conversion is far from complete.

It has now been surprisingly discovered, that when a "reactive" diluent, instead of an inert gas, is used in conjunction with the substrate and is passed through the molten salt medium, a substantially complete conversion of the substrate is achieved in a single pass. The term "reactive" diluent designates a suitable substance which acts as an acceptor—or scavenger—for the hydrogen halide which is eliminated from the substrate during the reaction.

It is believed that the fast reaction of the "reactive" diluent with the eliminated hydrogen halide has a pronounced beneficial effect on the yield of the desired product for two reasons. It is known that elimination of hydrogen halide from the substrate is a reversible reaction. If it is carried out in the presence of a acceptor for the hydrogen halide that is being eliminated, the equilibrium is shifted in the direction of the product, and the process can thereby be carried out at temperatures that are substantially lower than in the absence of the acceptor. This has the effect of increasing the selectivity of the reaction with respect to the desired product.

The enhanced selectivity of the reaction, which is achieved in the presence of the "reactive diluent" is believed to be a consequence also of the prompt removal of the hydrogen halide from the system, since this is known to catalyze the polymerization of vinylic monomers to produce oligomeric materials, which are highly undesirable.

Another advantage in use of "reactive diluents" according to the present invention is the rational utilisation of the bromine.

By reacting the hydrogen bromide, which is eliminated from the bromoethyl bromobenzene, with the "reactive diluent" hereinafter described, useful and highly valued by-products are directly obtained instead of hydrobromic acid, which has a lower "bromine value."

As "reactive diluents" according to the present invention may be employed lower aliphatic alcohols and the by-products are the respective alkyl halides. When methanol is used in conjunction with the substrate, methyl bromide is obtained, in quantitative yield. When ethyl alcohol is used the resulting by-product is ethyl bromide. These are widely used as soil sterilizers and fumigants, as well as fire extinguishing agents.

Suitable salts, that in the molten state effect the dehydrohalogenation of said halobenzenes are chloride or bromides of various metals, in particular the alkali metal and alkaline earths, or mixtures of such salts. Since the reaction proceeds at high rates already at temperatures of about 300° C., the choice of the salts or mixtures of these salts is restricted to low melting materials, as no particular advantage is gained by carrying out the process at temperatures of above 500° C.

Various metal salts of mineral acids may be employed in this process. Bromides are of special efficacy. If other anions are used, such as chloride, the chlorine of the molten salt is first exchanged by bromine, with the result that hydrogen chloride first emerges from the molten salt mixture. After the chloride has been totally, or nearly totally, exchanged by bromide, there begins the emergence of hydrogen bromide, and thus the molten-salt mixture is converted to a mixture of the respective bromides.

Although molten metal sulfates exhibit a catalytic effect in this reaction, most of these have high melting points, and are therefore not convenient in use. Nitrates or perchlorates are not practical since a combination of oxidizing salts and an organic substrate brought in contact with these may result in explosions.

In the following table are listed a number of chlorides and bromides of various metal ions that were found as effective catalytic media for the dehydrohalogenation reaction.

| Salt or salt mixture in weight percent: | M.P., °C. |
| --- | --- |
| 52% LiBr, 48% KBr | 348 |
| 44% LiBr, 41% Br, 15% CaBr$_2$ | 350 |
| 44% LiBr, 41% Br, 15% ZnBr$_2$ | 332 |
| 46% LiCl, 54% KCl | 352 |

The reaction in accordance with this invention may conveniently be carried out in various ways. One possible way is that of introducing the substrate together with the "reactive diluent" through an entrance at the bottom of the vessel containing the molten salt mixture. After passing the molten salts zone, it is important that the product as well as the unreacted substrate—to the extent that such is contained in the emerging mixture—are removed from the heated vessel as fast as possible, so as to be quenched in order to minimize polymerization of the product. This may be accomplished by applying a vacuum to the molten-salt reactor, so that the mixture emerging from the reaction medium is withdrawn almost immediately and condensed in a cooled vessel.

The elimination reaction by means of a molten salt catalyst to produce bromostyrene is not limited to the substrate as hereinbefore described. It proceeds with similar ease if the analogous—α- or β-chloroethyl—bromo—benzenes are introduced into the reactor, although optimal yields of products are obtained at higher temperatures than with the substrate heretofore mentioned.

DESCRIPTION OF THE PREFERRED EMBODIMENTS

The nature of this invention is described by the following examples, to which the scope of the invention is not limited:

Example 1

The reaction flask consisted of a glass tube with a narrow capillary tube connected at the bottom and an exit tube at the top. A mixture of 100 g. LiBr, 90 g. KBr and 30 g. CaBr$_2$ were melted in the reaction flask and the melt was kept at 380° C. A slow stream of nitrogen was continually introduced through the bottom capillary. 20 g. of α-bromoethyl bromobenzene dissolved in 7.2 g. methanol were injected into the nitrogen stream at a slow rate in about 2 hours. The effluent gas mixture was passed through a trap cooled to −30° C., to collect the heavy products, and one cooled in liquid air, to collect the methyl bromide. The products were separated by fractional distillation, first at regular pressure, and then in vacuum, 13 g. of bromostyrene, 6.5 g. methyl bromide, and some unconverted methanol were recovered. The bromostyrene yield was 93% and methyl bromide yield 90%.

Example 2

A solution of 20 g. α-bromoethyl bromobenzene in 11 g. ethanol were reacted in the manner described in Example 1. The products were 12.5 g. bromostyrene, namely 90% yield, and 9.0 g. ethylbromide, namely 95% yield.

Example 3

20 g. α-bromoethyl bromobenzene were reacted in the manner described in Example 1. The products contained 8 g. unconverted substrate, 6.5 g. bromostyrene and 3 g. HBr. The yield of bromostyrene based on reaction substrate was 78%.

Example 4

20 g. α-bromoethyl bromobenzene and 7 g. methanol were reacted in the manner described in Example 1, only the salt mixture consisted of 100 g. LiBr, 120 g. KBr and 50 g. PbBr$_2$. The product contained 11.6 g. bromostyrene (84% yield) and 6 g. methyl bromide (83% yield).

Example 5

20 g. α-bromoethyl bromobenzene in 8 g. methanol were reacted in the manner described in Example 1, only the salt mixture consisted of 100 g. LiBr, 80 g. KBr and 10 g. ZnBr$_2$. The products contained 1.2 g. unconverted substrate, 11.0 g. bromostyrene (85% yield) and 6.1 g. methyl bromide (90% yield).

Example 6

20 g. α-bromomethyl bromobenzene in 7 g. methanol were reacted in the manner described in Example 1, only the salt mixture consisted of 100 g. LiBr and 90 g. KBr. The products contained 2 g. unconverted substrate, 10.5 g. bromostyrene (84% yield) and 6.0 g. methyl bromide (92% yield). The ratio of para- to ortho- derivative in the substrate introduced into the reactor as well as the uconverted substrate was 4.8. In the bromostyrene product the ratio of para- to ortho- derivatives was found to be 5.1. This shows that the reactivity of both isomers is essentially the same.

Example 7

20 g. β-bromoethyl bromobenzene were reacted in molten salts heated to 420° C. in the manner described in Example 1. The products, after fractionation, yielded 8.2 g. β-bromoethyl bromobenzene, 5.8 g. bromostyrene and 3.5 g. HBr. This amounts to 70% bromostyrene yield based on the reacted substrate.

Example 8

20 g. of β-bromoethyl bromobenzene dissolved in 20 g. butanol and reacted in the manner of Example 7. The fractionated products consisted of 3 g. unreacted substrate, 10.5 g. bromostyrene (88% yield) and 8.9 g. butyl bromide (90% yield).

We claim:
1. Process for the simultaneous production of bromostyrene and alkyl bromide, which comprises contacting a member selected from the group consisting of alpha-bromoethyl bromobenzene and beta-bromoethyl bromobenzene and an alkanol with a molten alkali metal bro- mide or alkaline earth bromide at a temperature between 250° C. and 500° C.

2. A process according to claim 1, wherein the reactants are passed through a bed of the molten salt or salts.

3. A process according to claim 1, wherein the reaction mixture is passed together with an inert carrier gas through the molten salt or salts.

4. A process as claimed in claim 1, wherein the alkanol is a lower alkanol.

5. A process according to claim 4, wherein the alkanol is methyl alcohol.

6. A process according to claim 1, wherein the salt is a mixture selected from the following: lithium bromide, potassium bromide, calcium bromide and sodium bromide.

7. A process according to claim 1 wherein the molar ratio of bromoethyl bromobenzene to alkanol is between 2:1 and 1:5.

8. A process according to claim 1, wherein the reaction products are quenched rapidly after the passage through the reaction zone.

References Cited

UNITED STATES PATENTS 2,443,217  6/1948  Amos et al. _____ 260—650 R

FOREIGN PATENTS 986,634  3/1965  Great Britain _____ 260—650

HOWARD T. MARS, Primary Examiner

U.S. Cl. X.R.

260—652 R, 657